United States Patent
Frolov et al.

(10) Patent No.: US 10,576,653 B2
(45) Date of Patent: Mar. 3, 2020

(54) RIP FENCE HAVING MICRO-ADJUSTMENT FOR A POWER TOOL

(71) Applicants: Robert Bosch Tool Corporation, Broadview, IL (US); Robert Bosch GmbH, Stuttgart (DE)

(72) Inventors: Andrew Frolov, Glenview, IL (US); Gary L. Voong, Berwyn, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 52 days.

(21) Appl. No.: 15/230,058

(22) Filed: Aug. 5, 2016

(65) Prior Publication Data

US 2018/0036902 A1    Feb. 8, 2018

(51) Int. Cl.
*B23D 47/02* (2006.01)
*B27B 27/02* (2006.01)
*B27B 27/10* (2006.01)
*B23Q 3/00* (2006.01)

(52) U.S. Cl.
CPC ............ *B27B 27/10* (2013.01); *B23D 47/025* (2013.01); *B23Q 3/005* (2013.01); *B27B 27/02* (2013.01); *Y10T 83/741* (2015.04); *Y10T 83/7647* (2015.04); *Y10T 83/773* (2015.04)

(58) Field of Classification Search
CPC .... B23D 47/025; B23D 47/045; B27B 27/02; B27B 27/08; B27B 27/10; B23Q 3/005; Y10T 83/727; Y10T 83/741; Y10T 83/76; Y10T 83/7647; Y10T 83/773
USPC .... 83/438, 446, 477.2, 468, 468.7; 254/104; 269/303, 315
See application file for complete search history.

(56) References Cited

U.S. PATENT DOCUMENTS

| | | | | |
|---|---|---|---|---|
| 194,582 A | * | 8/1877 | Cole | B65B 13/025 254/234 |
| 401,368 A | * | 4/1889 | Piper | B27L 7/06 254/104 |
| 4,600,184 A | * | 7/1986 | Ashworth | B23Q 3/005 269/303 |
| 4,713,993 A | * | 12/1987 | Litowitz | B27B 27/10 83/34 |
| 5,181,446 A | | 1/1993 | Theising | |

(Continued)

OTHER PUBLICATIONS

International Search Report corresponding to International Patent Application No. PCT/EP2017/069797 (6 pages).

*Primary Examiner* — Clark F Dexter
(74) *Attorney, Agent, or Firm* — Maginot, Moore & Beck LLP

(57) ABSTRACT

A guide assembly for aligning a workpiece on a table of a saw device includes a guide member having a first end and a second end along the longitudinal axis that is sized to span a dimension of the table. The guide member includes first and second locking mechanisms located at opposite ends of the guide member that are operable to secure the guide member to the table. The guide assembly further includes a fine adjustment mechanism incorporated into the guide member that is operable when the first and second locking mechanisms are locked. The adjustment assembly includes a side plate movably mounted to the guide member between the first and second ends, and a movement mechanism for moving the side plate relative to the guide member in a direction perpendicular to the longitudinal axis.

16 Claims, 19 Drawing Sheets

(56) References Cited

U.S. PATENT DOCUMENTS

| | | | |
|---|---|---|---|
| 5,337,641 A | | 8/1994 | Duginske |
| 5,427,349 A | * | 6/1995 | Obrecht ................. B21D 28/00 |
| | | | 248/188.4 |
| 6,360,642 B1 | * | 3/2002 | Miller et al. ............ B27B 27/02 |
| | | | 269/303 |
| 7,077,043 B1 | * | 7/2006 | Koerble et al. ......... B27B 25/00 |
| | | | 144/204.2 |
| 8,899,545 B2 | * | 12/2014 | Blees et al. .............. B64D 9/00 |
| | | | 244/118.1 |
| 2001/0047706 A1 | * | 12/2001 | Parks et al. .......... B23D 47/025 |
| | | | 83/435.12 |
| 2002/0050201 A1 | | 5/2002 | Lane et al. |
| 2002/0108480 A1 | | 8/2002 | Hewitt et al. |
| 2014/0174273 A1 | | 6/2014 | Frolov |

\* cited by examiner

RIP FENCE HAVING MICRO-ADJUSTMENT FOR A POWER TOOL

FIELD

The disclosure relates generally to power tools, and more particularly to a workpiece guides or fences for a saw device that helps the operator to accurately introduce a workpiece into and through a cutting instrument.

BACKGROUND

One typical saw device includes a cutting instrument, usually a saw blade, attached to a motor mounted beneath a work surface, commonly called a table. The table has an opening that allows a portion of the blade to extend through the table. To make a cut, an operator places a workpiece on the table and directs the workpiece through the rotating blade. To assist operators in making accurate cuts, many table saws are adapted to receive fences or material guides.

One type of fence commonly found on table saws is the rip fence. The rip fence, also known as a guide assembly, is a table saw guide that assists operators in making lengthwise cuts through a workpiece, as when cutting wood along the grain. Most rip fences traverse the table parallel to the cutting direction of the blade. In order to make cuts of varying width, an operator slides the fence along the table closer to or farther away from the blade. To ensure an accurate cut is made, the fence should be securely fastened to the table.

A clamping system is commonly used to secure the rip fence to the table. The clamping system secures the fence to a guide located towards the front of the table and a guide located towards the rear of the table. The guides often extend perpendicularly to the cutting direction of the blade and traverse the entire width of the table. Previously known rip fence clamping systems utilize a rip fence that slides along the guides mounted at the front and the rear of the table. When the operator places the fence in a particular position relative to the cutting blade, the operator activates a locking mechanism at the front which engages a locking mechanism at the rear that secures both ends of the rip fence to the table.

If the rip fence is not positioned properly to support the workpiece for the desired cut, the operator must disengage the locking mechanism and shift the rip fence slightly, usually by rapping the fence lightly with the hand. The operator must then re-lock the fence and determine whether it is properly positioned for the desired cut. Moreover, the operator must make sure that the rip fence is square with the work table and parallel with the cutting blade.

In view of the foregoing, it would be advantageous to provide a rip fence for a table saw where the rip fence provides for increased accuracy in positioning a workpiece. Furthermore, it would be advantageous if the rip fence could be accurately located and clamped in the desired position without resorting to trial and error.

SUMMARY

In accordance with one aspect of the present disclosure, there is provided a guide assembly for aligning a workpiece on a table of a saw device comprises a guide member having a longitudinal axis and a first end and a second end along the longitudinal axis, the guide member sized to span a dimension of the table. The guide member includes a first locking mechanism located at the first end of the guide member and operable to secure the first end to the table, and a second locking mechanism located at the second end of the guide member and operable to secure the second end to the table. The guide assembly further includes a fine adjustment mechanism incorporated into the guide member that is operable when the first and second locking mechanisms are locked. The adjustment assembly includes a side plate movably mounted to the guide member between the first and second ends, and a movement mechanism for moving the side plate relative to the guide member in a direction perpendicular to the longitudinal axis.

In another aspect of the disclosure, a power saw is provided that comprises a blade, a table including an elongated opening configured to receive the blade, and a guide member having a longitudinal axis and a first end and a second end along the longitudinal axis, the guide member sized to span a dimension of the table. The guide member includes a first locking mechanism located at the first end of the guide member and operable to secure the first end to the table, and a second locking mechanism located at the second end of the guide member and operable to secure the second end to the table. The guide assembly further includes a fine adjustment mechanism incorporated into the guide member that is operable when the first and second locking mechanisms are locked. The adjustment assembly includes a side plate movably mounted to the guide member between the first and second ends, and a movement mechanism for moving the side plate relative to the guide member in a direction perpendicular to the longitudinal axis toward the blade.

DETAILED DESCRIPTION

Figure 1:
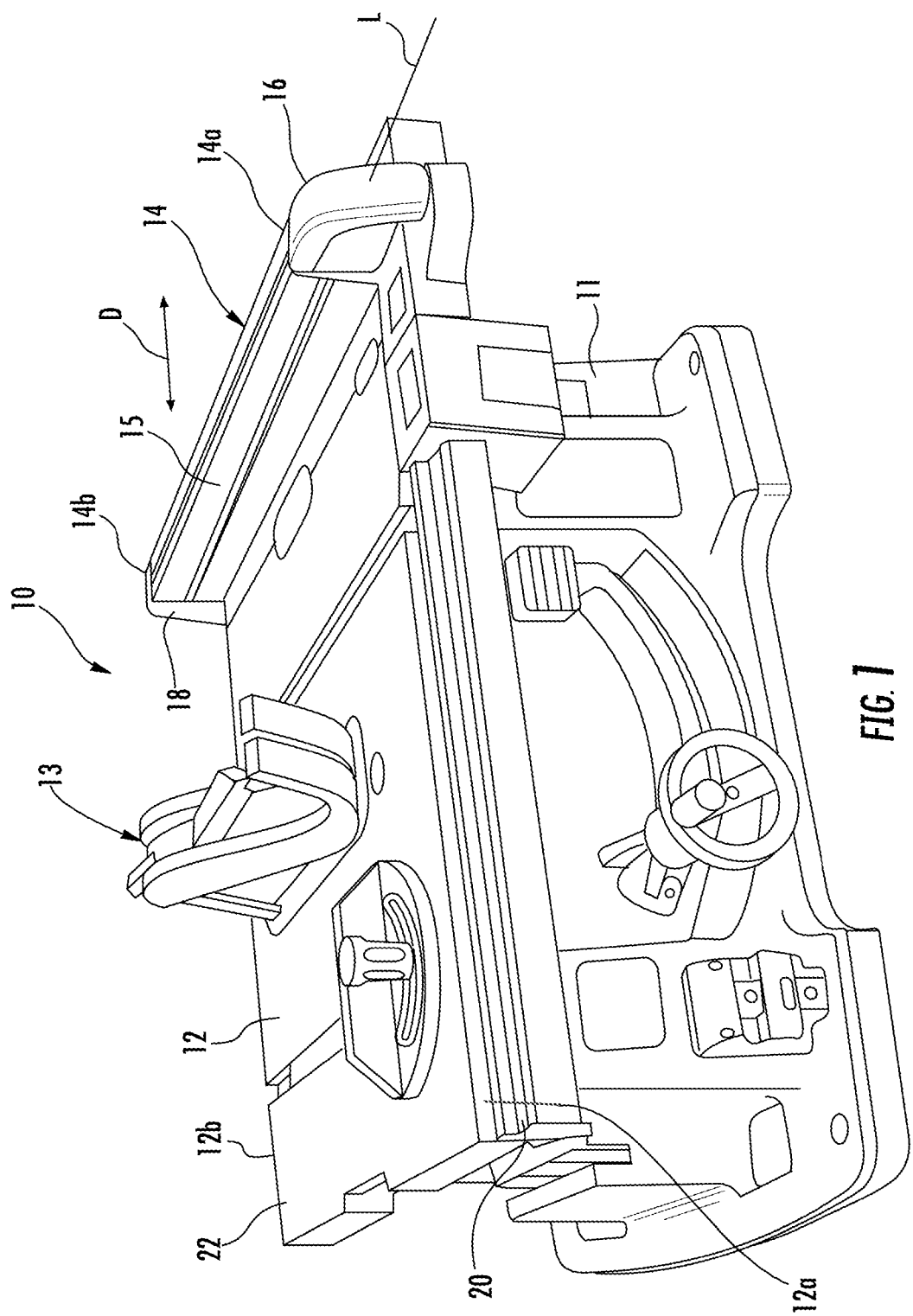
FIG. 1 is a perspective of a table saw including a rip fence.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIG. 1 is a perspective of a saw device 10 including an elongated guide assembly 14 configured to provide a surface for guiding a workpiece. The saw device may be, a table saw, a bevel saw, a compound saw, a vertical saw, a band saw, a jig saw, a machine saw, or any cutting device with a saw blade. For the present disclosure, the saw device 10 is depicted as a table saw 10. The table saw 10 includes a base 11 that supports an enclosure that houses a drive assembly and supports a blade assembly 13 that incorporates a circular saw, jig saw, vertical saw or other similar cutting device. The base further includes a planar working surface 12 on which the workpiece is placed during a cut.

Figure 2:
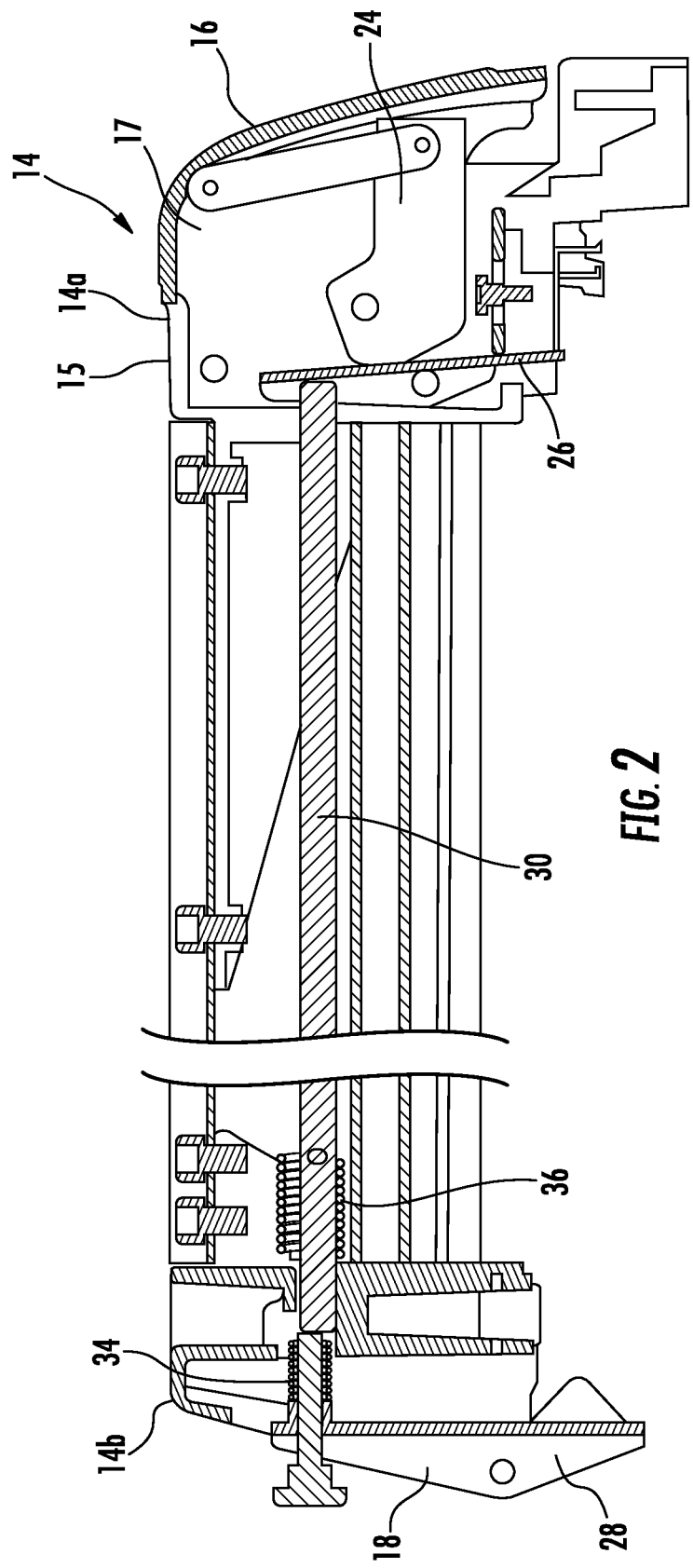
FIG. 2 is a sectional side view of the rip fence including a clamping assembly in an unclamped position taken along a line 2-2 of FIG. 1.

The guide assembly 14 can be in the form of an elongated rip fence 14, shown in more detail in FIG. 2, and includes a first locking mechanism 16 at one end 14a of the fence that is positioned at the front 12a of the working surface 12, and a second locking mechanism 18 at the opposite end 14b of the fence that is positioned at the rear 12b of the working surface. The two mechanisms are selectively moveable between a locked position and an unlocked position. When in the locked position, the first and second locking mechanisms 16, 18 engage guides 20, 22 associated with the base 11 or the working surface 12 in such a manner that the fence 14 can be aligned prior to being secured to and fixed in place with respect to the blade assembly 13. When in the unlocked position, the first and second locking mechanisms 16, 18 disengage from the respective guides 20, 22 so that the rip fence 14 is free to slide along the table surface toward or away from the blade assembly 13 in a direction D generally perpendicular to a longitudinal axis L of the rip fence.

Certain details of a conventional rip fence are shown in the cross-sectional view of FIG. 2. The first locking mechanism 16 includes a handle 17 that is pivotably mounted to a housing 15 of the rip fence. A linkage mechanism 24 is provided between the housing and an activation plate 26 that locks the rip fence to the front guide 20 of the table saw. The activation plate 26 also contacts a rod 30 that is operable to release the second locking mechanism 18 at the rear of the work surface 12. The second locking mechanism 18 includes a locking arm 28 that engages the guide 22 at the rear of the table saw. A biasing spring 34 biases the second locking mechanism 18 to its unlocked position, and a biasing spring 36 biases the activation plate 26 of the first locking mechanism to its unlocked position. Thus, the first and second locking mechanisms are biased to their respective unlocked positions. In order to release the locking mechanisms 16, 18, the handle 17 is pivoted outward from the rip fence housing 15, which allows the activation plate 26 to move to its unlocked position as the rod 30 is pushed by the biasing spring 36 and allows the lock arm 28 to pivot to its unlocked position. Pivoting the handle 17 toward the housing 15 pushes the activation plate 26 to its locked position and pushes the rod 30 which pivots the lock arm 28 to its locked position shown in FIG. 2.

Figure 3:
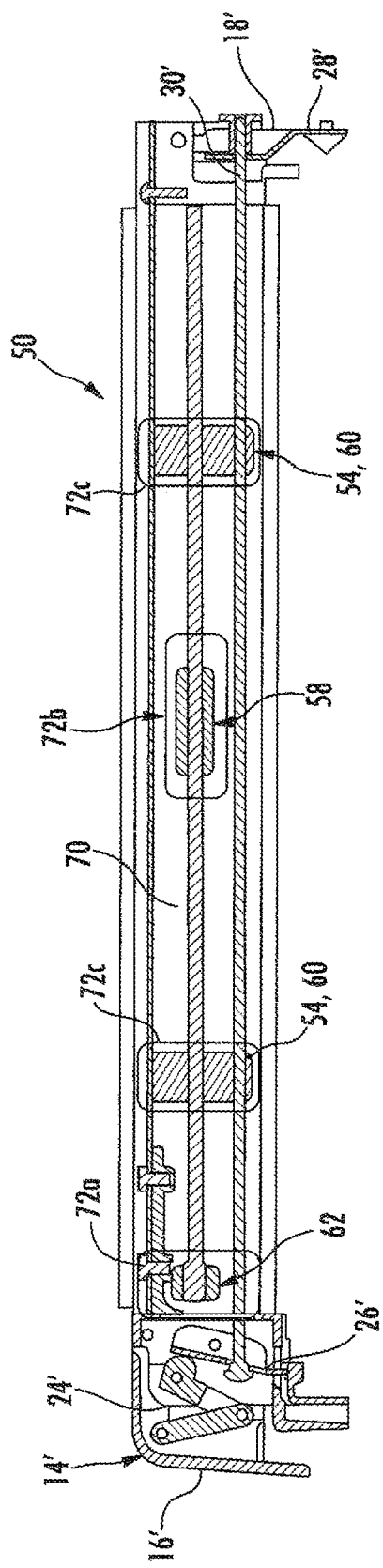
FIG. 3 is a sectional side view of a rip fence including a fine adjustment mechanism in combination with the locking mechanisms according to one aspect of the present disclosure.

An alternative guide assembly or rip fence 14' is shown in FIG. 3 that includes a first locking mechanism 16' with a modified linkage assembly 24' actuating an activation plate 26', and a rod 30' that actuates the lock arm 28' of a modified second locking mechanism 18'. Further details of this type of rip fence locking mechanism are disclosed in pending application Ser. No. 13/727,252, published as US2014/0174273 on Jun. 26, 2014, the entire disclosure of which is incorporated herein by reference. The first and second locking mechanisms 16', 18' operate similar to the mechanisms in FIG. 2 to lock the rip fence to the work surface 12 in a fixed position relative to the blade assembly 13, while the rip fence 14' acts as a guide for the workpiece.

In accordance with one feature of the present disclosure, the guide assembly or rip fence is modified to provide a fine adjustment capability in which the guide surface which guides the workpiece during a cut is adjustable. Thus, in one embodiment shown in FIGS. 3-4, a fine adjustment mechanism 50 is incorporated into a rip fence 14'. The adjustment mechanism 50 includes a pair of side plates 52 movably supported by a housing 70 of the rip fence. The side plates 52 each define a planar surface 53 that are maintained parallel to the longitudinal axis L of the rip fence. The planar surface 53 thus provides a flat surface against which the workpiece is positioned during a cut. The side plates 52 are supported on the housing 70 of the rip fence to limit the movement of the side plates 52 to the direction D, namely perpendicular to the longitudinal axis L. More particularly the side plates 52 are limited to movement in a direction that is toward or away from the saw assembly 13 (FIG. 1). The side plates have a length that is less than the overall length of the rip fence, and more particularly a length that positions the side plates between the first and second locking mechanisms 16', 18'. In one embodiment the side plates are configured to reside within the overall envelop of the rip fence when the side plates are at their non-extended position shown in FIG. 4. However, it is understood that other side plate configurations are permitted, including side plates that extend beyond the ends of the rip fence.

Figure 4:
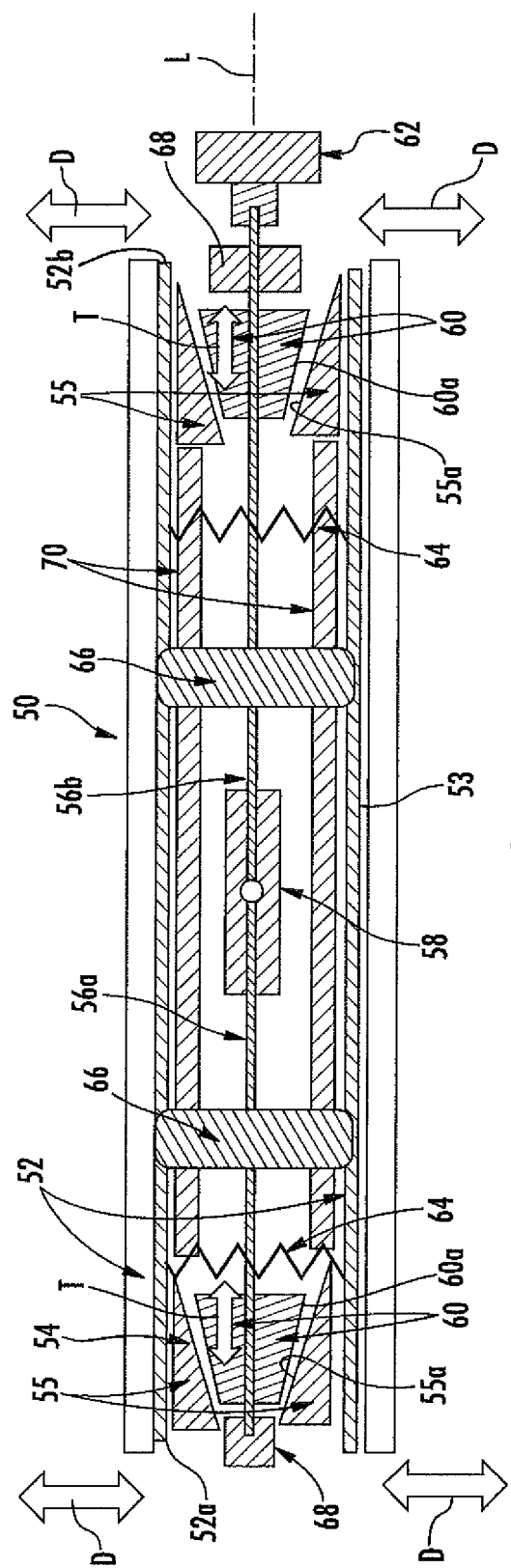
FIG. 4 is a sectional top view of the rip fence shown in FIG. 3.

The embodiment shown in FIG. 4 incorporates two side plates 52 on opposite sides of the rip fence. This configuration allows the rip fence to be positioned on the work surface 12 on either side of the blade assembly 13. However, it is understood that a single side plate may be provided on the side of the rip fence facing the blade assembly.

The fine adjustment mechanism 50 further includes a movement mechanism 54 that is mounted within the housing 70 of the rip fence 14' that is configured to move one or both of the side plates away from the housing in a uniform manner. In particular, when the rip fence 14' is mounted on a work table, such as shown in FIG. 1, the side plates 52 move toward or away from the saw assembly 13. The movement mechanism 54 is configure to ensure that the plates move consistently parallel to the longitudinal axis L of the rip fence without canting from the accurate position established by the rip fence. Accordingly, in one embodiment the movement mechanism 54 includes a pair wedge elements 55 disposed at each of the opposite ends 52a, 52b of the side plates, as shown in FIG. 4. The wedge elements can be fixed to the side plates in an appropriate manner. The wedge elements 55 are identically configured with a sloped surface 55a. The movement mechanism 54 further includes a movable wedge element 60 at each end 52a, 52b of the side plates. More particularly, a movable wedge element 60 is disposed between each opposing pair of wedge elements 55 with a complementary sloped surface 60a facing a corresponding sloped surface 55a of the wedge elements.

The movable wedge elements 60 are in threaded engagement with driving members operable to move the movable wedge elements relative to the wedge elements 55 associated with the side plates 52. In one embodiment, the driving member includes threaded rod segments 56a, 56b that extend along the longitudinal axis L of the rip fence 14'. The two segments 56a, 56b are joined in the middle of the rip fence 14' by an adjustment nut 58 that can be used to adjust the positions of each movable wedge element 60 relative to the corresponding pair of wedge elements 55. The rod segments are supported by guides 66 that are integrated into the housing 70 of the rip fence and by bearings or bushings 68 that support the free ends of the rod segments for rotation while maintaining the rod segments against axial or lateral movement. The rod segment 56b extends beyond its associated guide 66 for engagement to control knob 62. The control knob is configured to be manually engaged to permit manual rotation of the knob and thereby the rod segments. As the knob and rod segments 56a, 56b rotate, the threaded engagement with the movable wedge elements 60 cause the movable elements to translate in the direction T along the rod segments, which is parallel to the longitudinal axis L of the rip fence. Thus, a clockwise rotation of the knob 62 and rod segments may cause the movable wedge elements to move to the left in the direction T in FIG. 4, while a counter-clockwise rotation may cause the movable elements to move to the right. As the movable wedge elements 60 move to the left, the sloped surface 60a of each element contacts the sloped surface 55a of a corresponding one of the pair of wedge elements 55. Further translation in the direction T of the movable wedge elements causes the movable elements 60 to push the pair of wedge elements 55 apart, thereby translating the side plates 52 accordingly.

The guides 66 may be further configured to guide the lateral movements of the side plates 52. The side plates and guides may thus incorporate an interlocking sliding arrangement that allows the side plates to translate and that guides the side plates for movement strictly in one direction. Thus, the guides and side plates may incorporate a sliding dovetail arrangement that can help ensure that the side plates move uniformly and without any canting as the wedge elements 55 drive the plates outward. The movement mechanism 54 further includes one or more return elements 64, which in the illustrated embodiment may be extension springs. As the side plates 52 are pushed outward by the wedge elements 55, the springs 64 stretch building up potential energy. As the movable wedge elements 60 are retracted away from the sloped surfaces 55a, the springs 64 return to their original length, thereby pulling the side plates toward each other. It can be appreciated that the return elements 64 may be incorporated into the guides 66 or into the rip fence housing 70.

Figure 5:
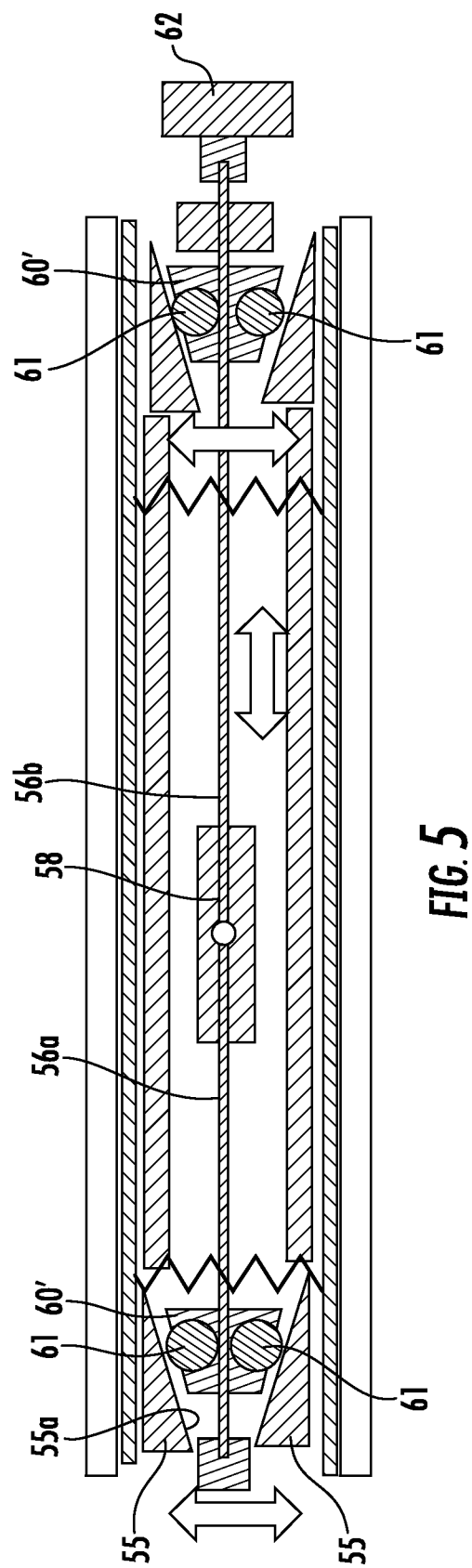
FIG. 5 is a sectional top view of a rip fence with a modified fine adjustment mechanism according to a further aspect of the disclosure.

The movable wedge elements 60 may be modified as shown in FIG. 5 to incorporate rollers 61. The rollers bear on the sloped surfaces 55a of the corresponding wedge elements 55. The rollers thus replace the surface-to-surface contact between the sloped surfaces 55a and 60a with at least one rolling element, thereby reducing friction during relative movement of the surfaces. The rollers 61 can thus produce a smoother and more uniform movement of the side plates.

Figure 6:
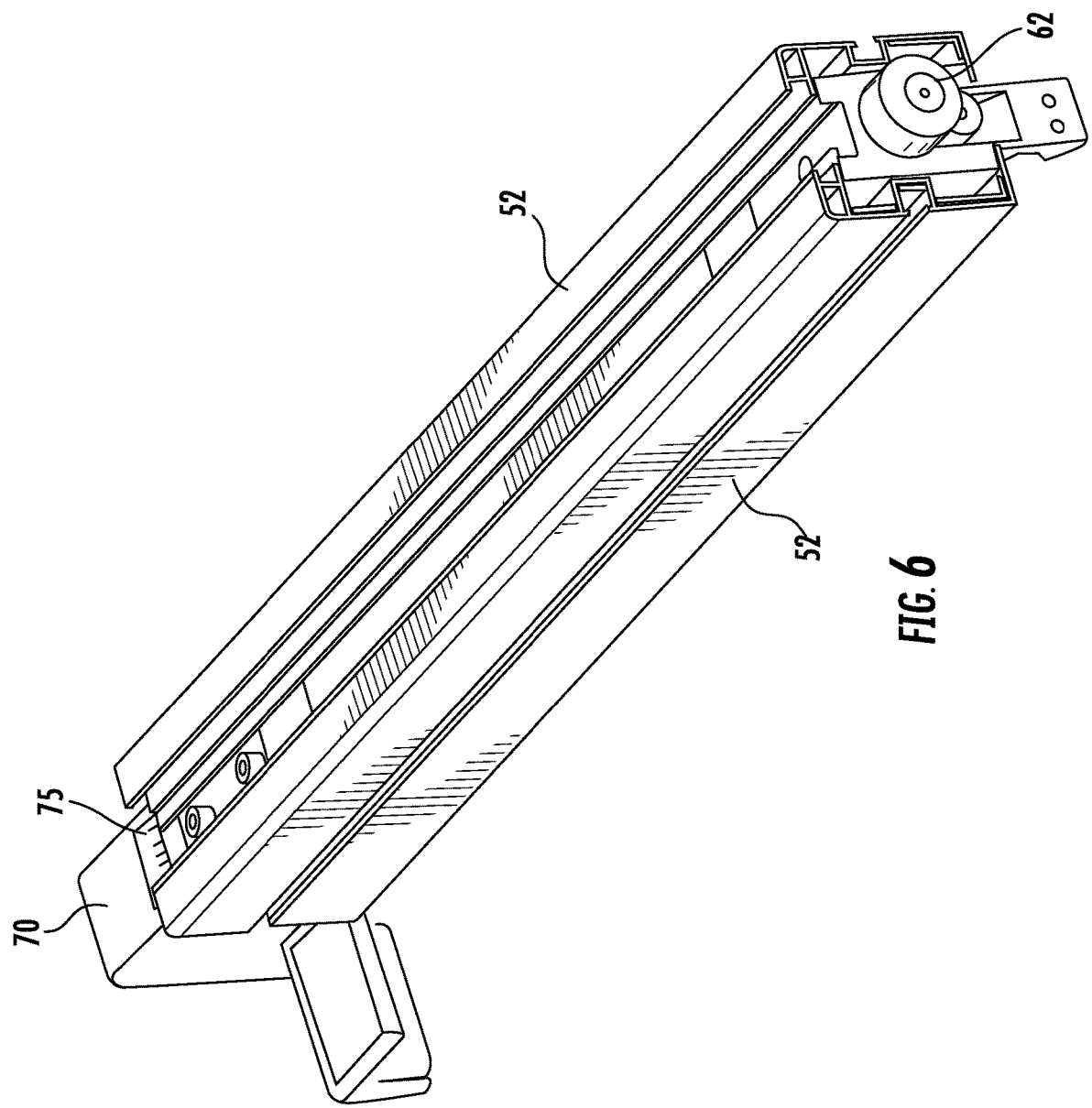
FIG. 6 is a perspective view of a rip fence with a fine adjustment mechanism having an end-mounted control knob.

The housing 70 may be provided with a scale 75 situated between the two movable side plates 52, as shown in FIG. 6. The side plates may incorporate an indicator, such as a needle, positioned over the scale 75. The scale allows the operator to determine an accurate measurement of the lateral movement of the side plates 52. A scale may be provided at opposite ends of the rip fence for use ensuring proper alignment of the movable side plates 52 during adjustment.

Figure 7:
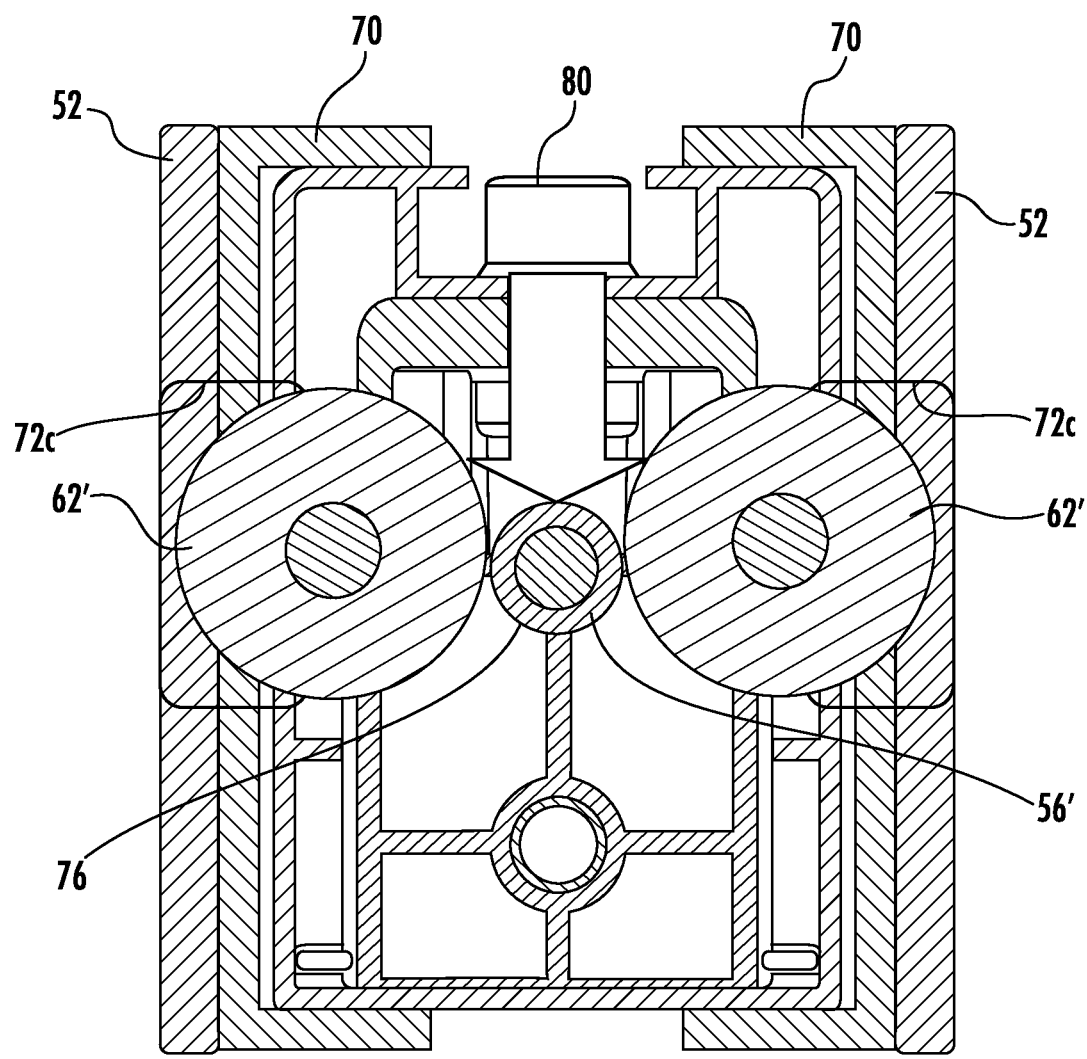
FIG. 7 is an end sectional view of a fine adjustment mechanism according to yet another embodiment of the present disclosure.
Figure 8:
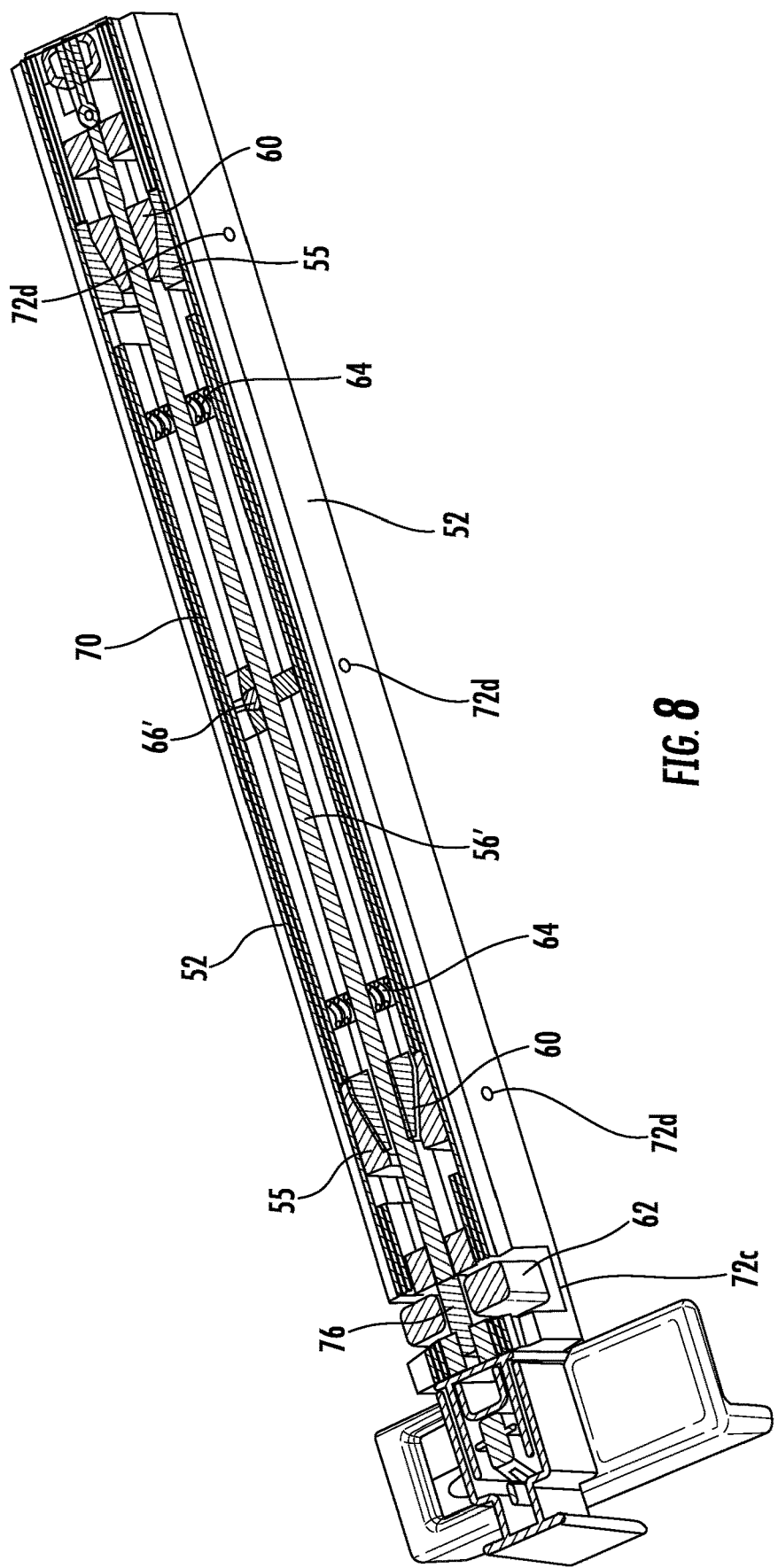
FIG. 8 is a cut-away view of a rip fence with a fine adjustment mechanism according to an alternative embodiment.
Figure 9:
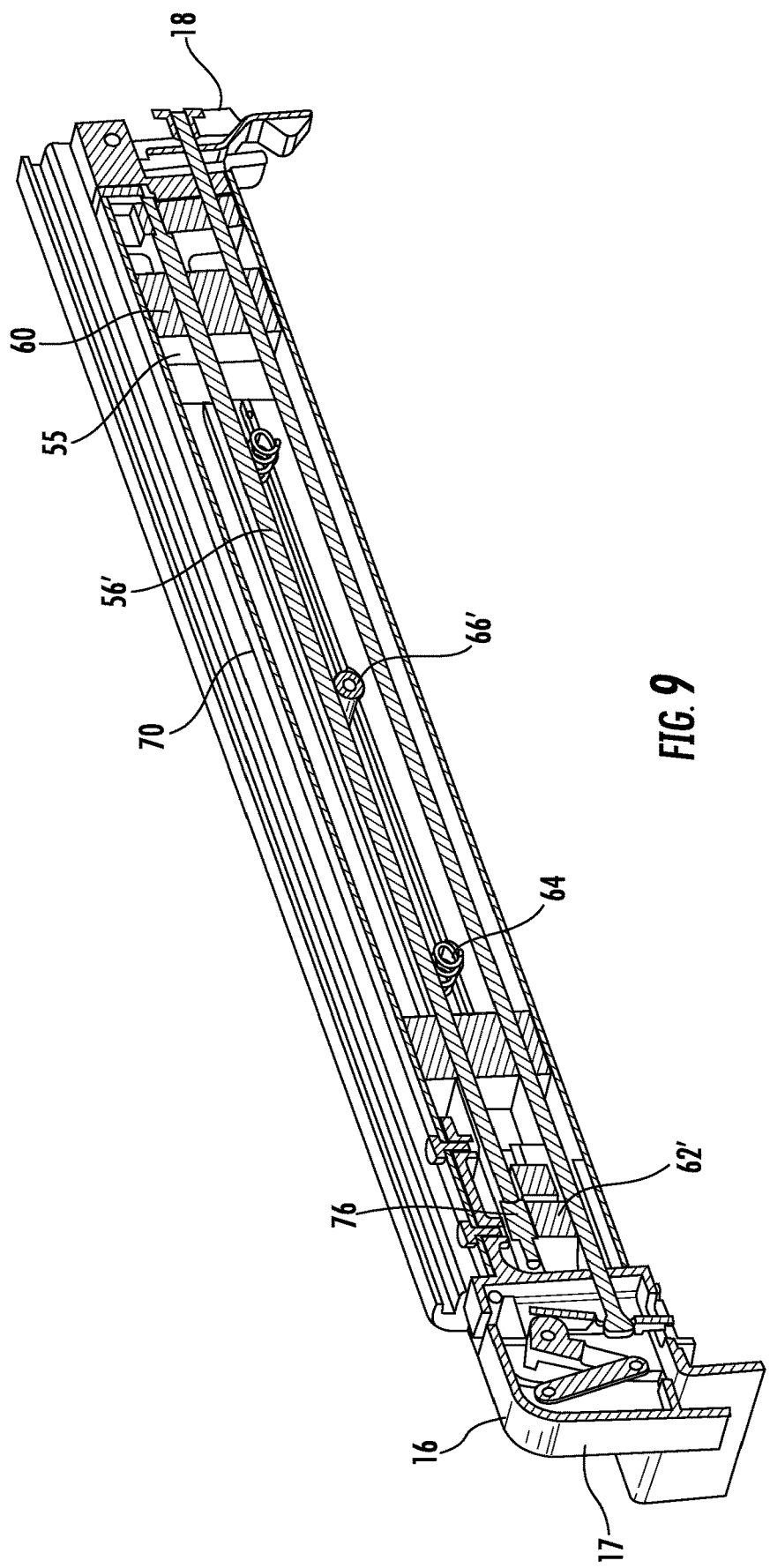
FIG. 9 is side cut-away view of the rip fence shown in FIG. 8.

In the embodiment of FIGS. 4-5, the control knob 62 is positioned at the end of the rip fence, and in particular at the end of the housing 70 with the lock arm 28' opposite the handle 17 of the first locking mechanism. In one alternative, control wheels 62' may be positioned inboard of the ends, accessible through one of openings 72c in the housing 70, as shown in FIGS. 7-9. Two control wheels may be provided, one on each side of the rip fence, to allow easy access by the tool operator. The two control wheels may engage a single threaded rod 56'.

Figure 10:
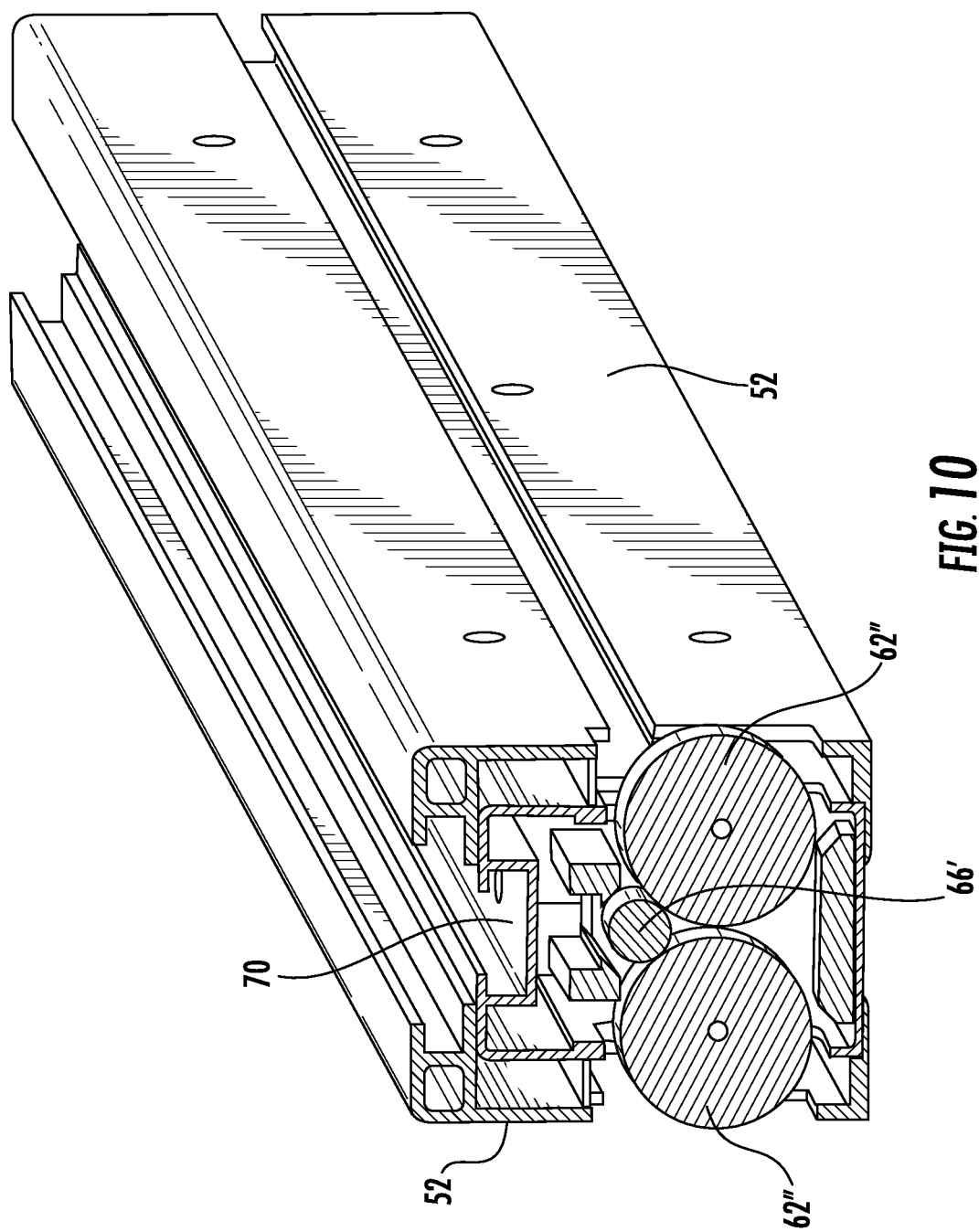
FIG. 10 is a partial cut-away view of the rip fence shown in FIGS. 8, 9 with modified control knobs.

The control wheels 62' may drive the threaded rod 56' by a friction interface. Thus, the control wheels may include a high-friction surface, such as a rubber surface, to engage and rotate the rod segments. Alternatively or in addition, the rod 56' may incorporate a friction wheel 76. As a further alternative, the friction wheel 76 may be replaced with a pinion gear and the control wheels may be provided with corresponding gear teeth for a meshed engagement with the pinion gear. As shown in FIG. 7, the control wheels 62' may be laterally adjacent the threaded rod 56'. In an alternative arrangement, the control wheels 62" may be positioned beneath the threaded rod 66', as illustrated in FIG. 10.

A locking element 80 may be provided that bears against the threaded rods 56 to prevent further rotation of the rods. The locking element may include a button situated on the top surface of the housing 70 that can be depressed to engage the threaded rods.

As shown in FIGS. 8-9, the guide 66' can be provided in the form of a pin or tube that extends transversely across the housing 70. The pin 66' is disposed within openings or bores 72d defined in the movable side plates 52 to support the side plates as they translate outward and inward relative to the housing. In this embodiment, the pins 66' can be dispersed along the length of the rip fence, with three locations depicted in FIG. 8.

Figure 11:
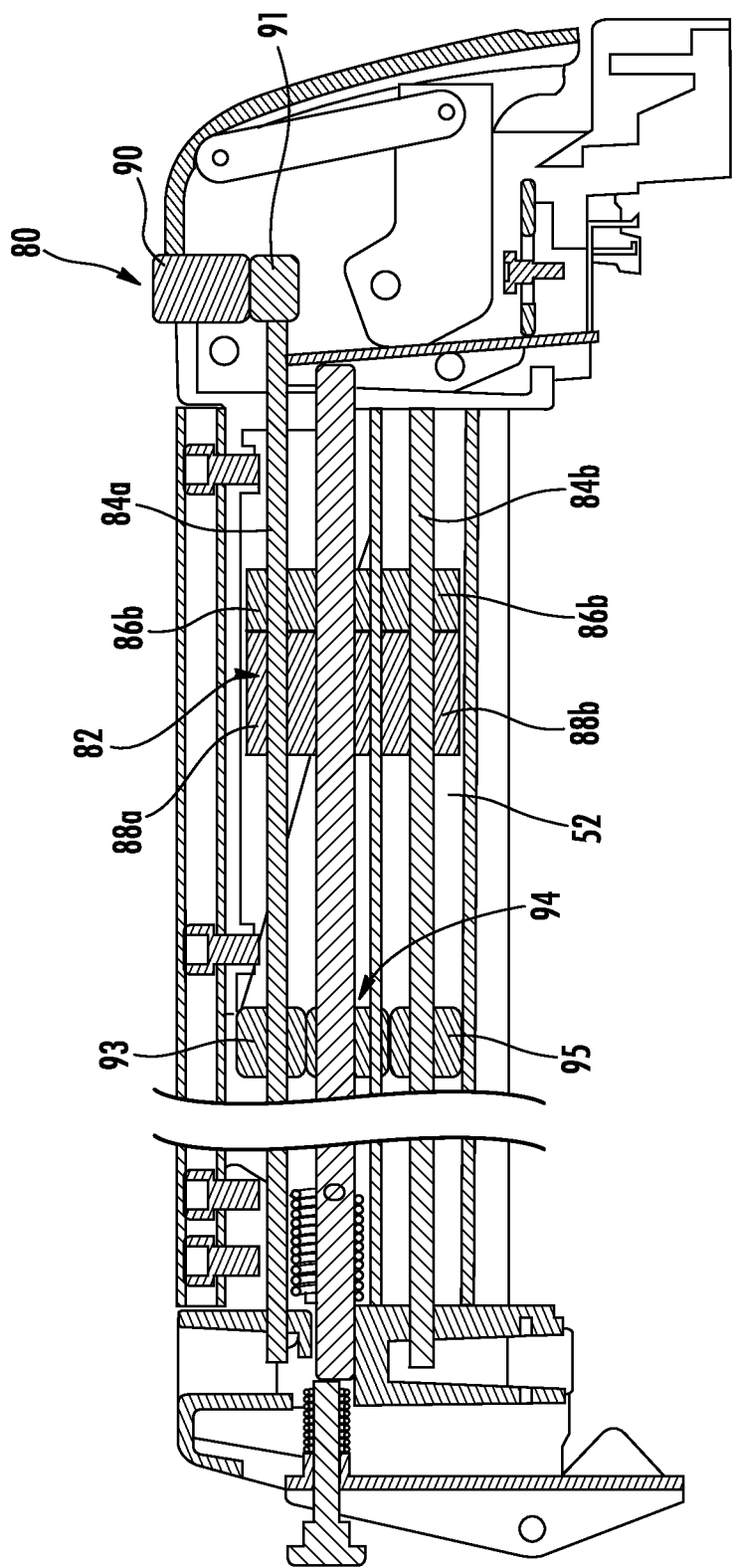
FIG. 11 is side cut-away view of a rip fence and fine adjustment mechanism according to yet another aspect of the present disclosure.

The rip fence and fine adjustment mechanism can take other forms that are capable of moving one or two side plates 52 relative to a rip fence housing that has been clamped or locked to a work surface 12 of a table saw 10. Thus, as shown in FIG. 11, a rip fence 80 can include a fine adjustment mechanism 82 that incorporates a driving member in the form of two threaded rods 84a, 84b. Each rod carries a corresponding movable wedge element 86a, 86b that engages wedge elements 88a, 88b mounted to the movable side plate 52 as in the previous embodiments. Although only one such arrangement of wedge elements are shown in FIG. 11, it is understood that two such arrangements may be provided as shown in FIG. 4.

A single control knob 90 can be rotatably supported at one end of the rip fence. The control knob rotatably engages an input gear 91 that is affixed to the uppermost threaded rod 84a. The uppermost rod 84a is coupled to the lowermost threaded rod 84b by a gear train that includes a drive gear 93 fixed to the uppermost rod, an idler gear 94 and a driven gear 95 fixed to the lowermost threaded rod. The idler gear 94 ensures that the two threaded rods 84a, 84b rotate in the same direction for a given input from the control knob 90. Rotation of the control knob thus causes an upper and lower set of wedge mechanisms (86a, b and 88a, b) to move the side plates 52 apart in the same manner described above. With this arrangement the movable plates are supported not only at both ends, as in the embodiment of FIG. 4, but also at the top and bottom of the plates, as shown in FIG. 11. This arrangement thus provides four points of support and movement of the side plates to ensure uniform parallel movement of the side plates.

Figure 12:
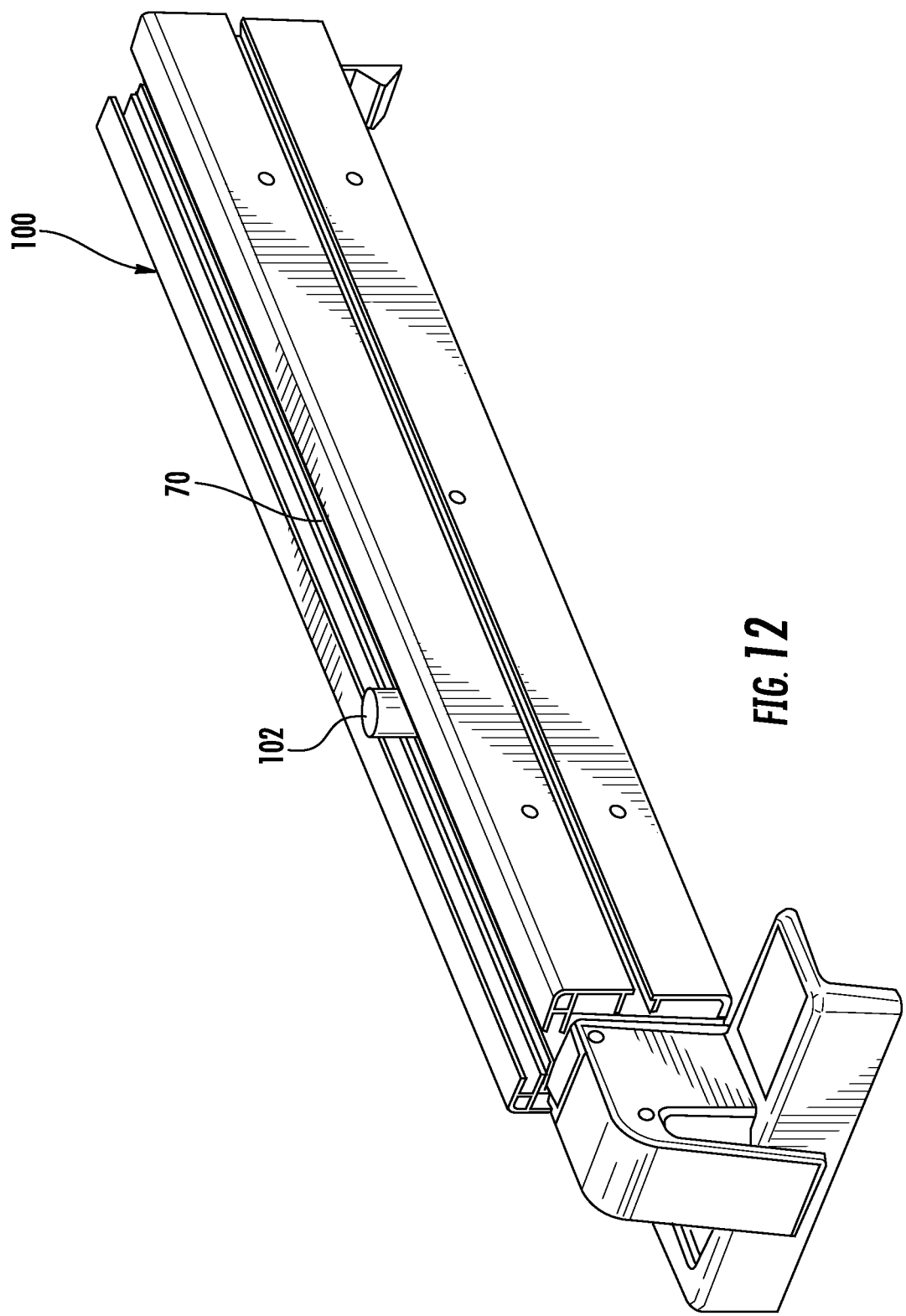
FIG. 12 is a perspective view of a rip fence with a fine adjustment mechanism having a top-mounted control knob according to another feature of the present disclosure.
Figure 13:
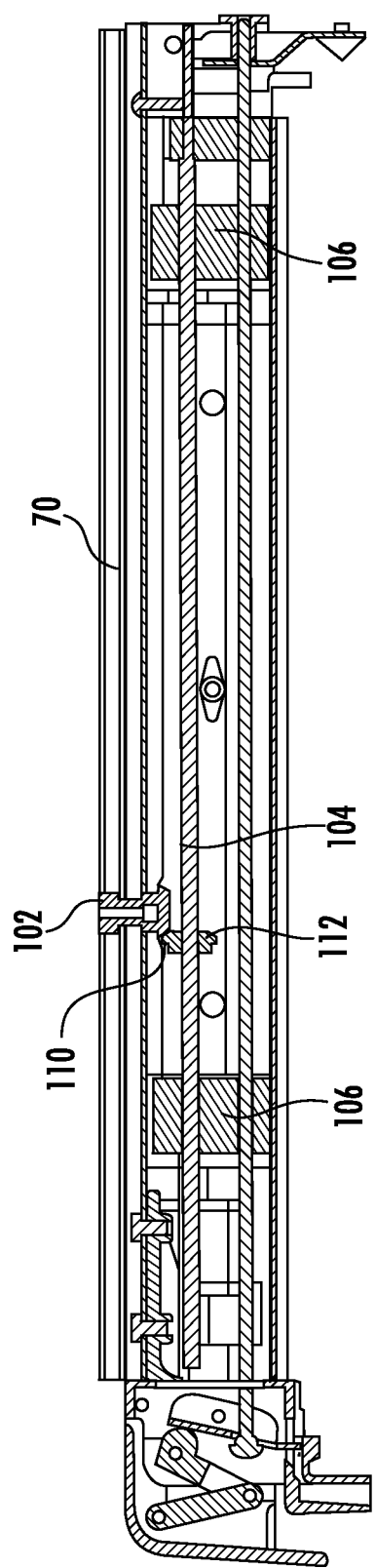
FIG. 13 is a side cut-away view of the rip fence shown in FIG. 12.
Figure 14:
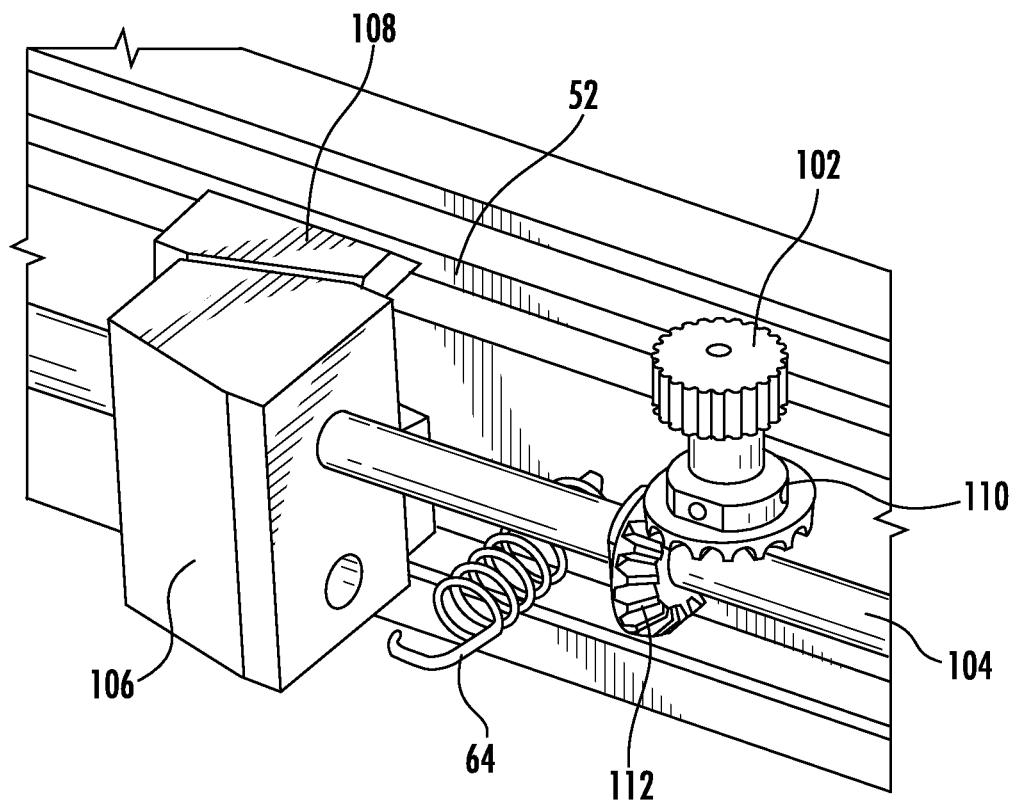
FIG. 14 is an enlarged view of components of the fine adjustment mechanism shown in FIGS. 12-13.
Figure 15:
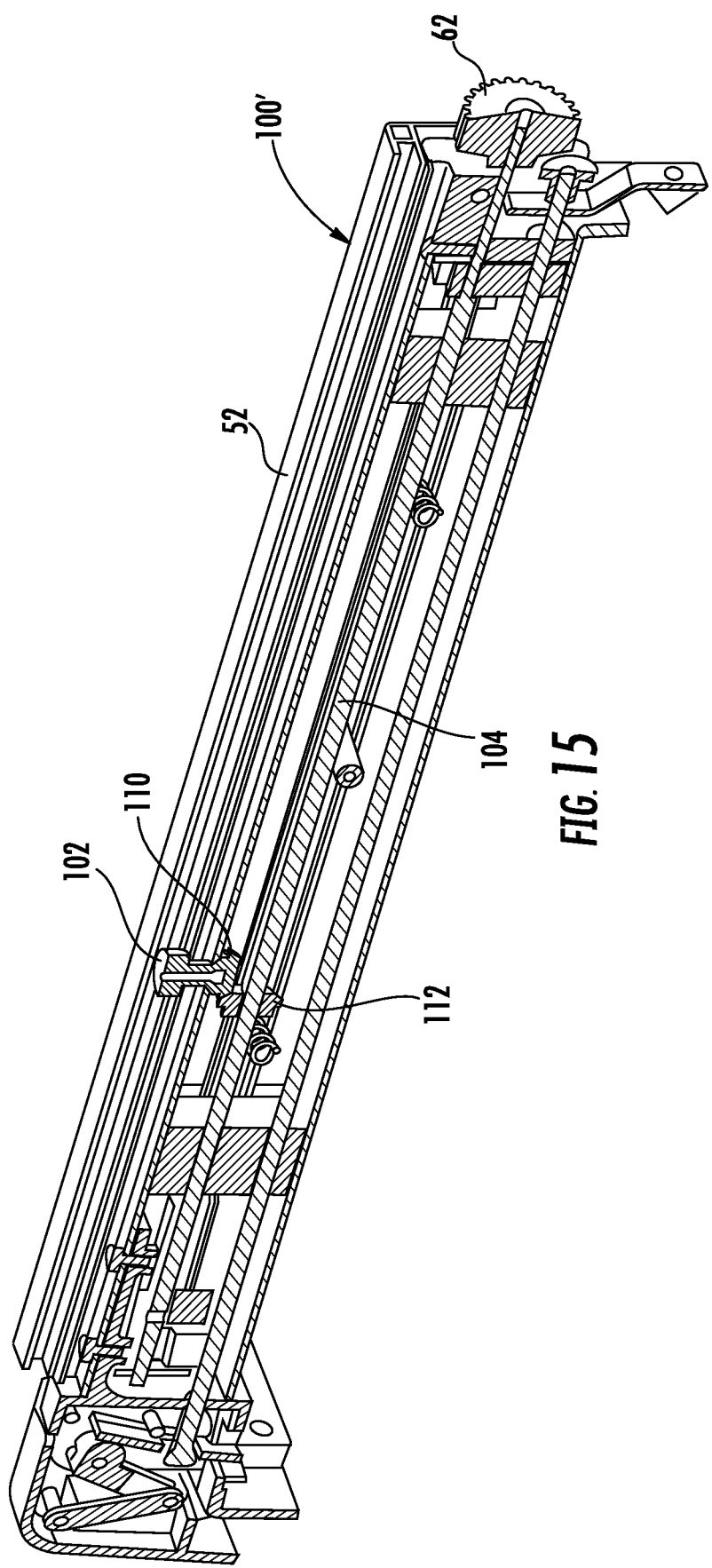
FIG. 15 is a partial cut-away view of a rip fence with a fine adjustment mechanism incorporating a top-mounted and an end-mounted control knob according to one aspect of the present disclosure.

Another alternative is shown in FIGS. 12-14 in which a rip fence 100 is provided with a control knob 102 at the top of the housing 70. The control knob 102 includes an input bevel gear 110 that engages a driven bevel gear 112 fixed to a threaded rod 104. The threaded rod engages a movable wedge element 106 which bears against the wedge element 108 mounted to the side plates 52. Rotation of the control knob 102 rotates the meshed bevel gears 110, 112 to perform the fine adjustment of the side plates 52. As shown in FIG. 15, the top control knob 102 of the rip fence 100 may be combined with the end control knob 62 of the embodiment shown in FIG. 4.

Figure 16:
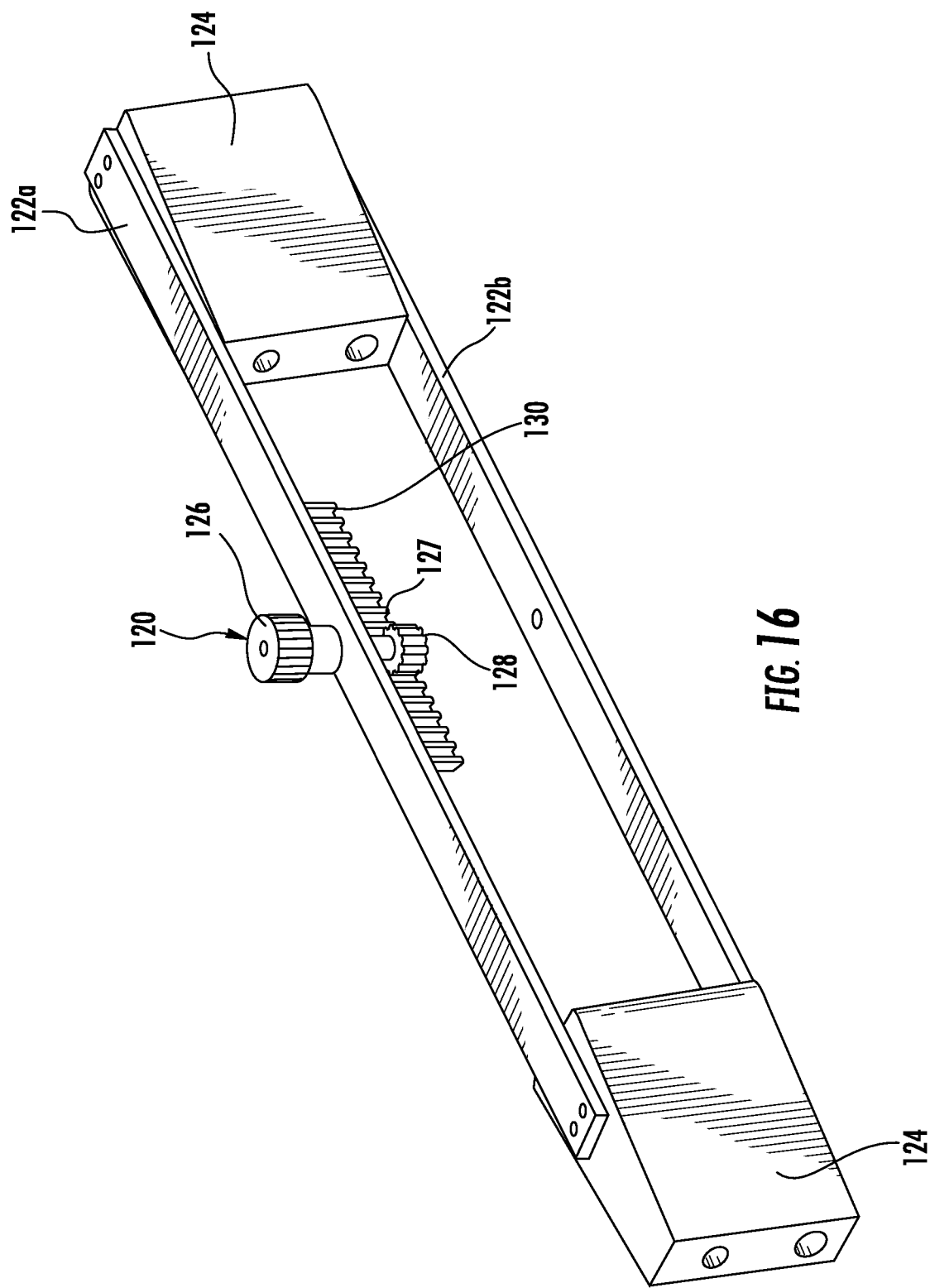
FIG. 16 is perspective view of components of a fine adjustment mechanism according to another embodiment of the present disclosure.
Figure 17:
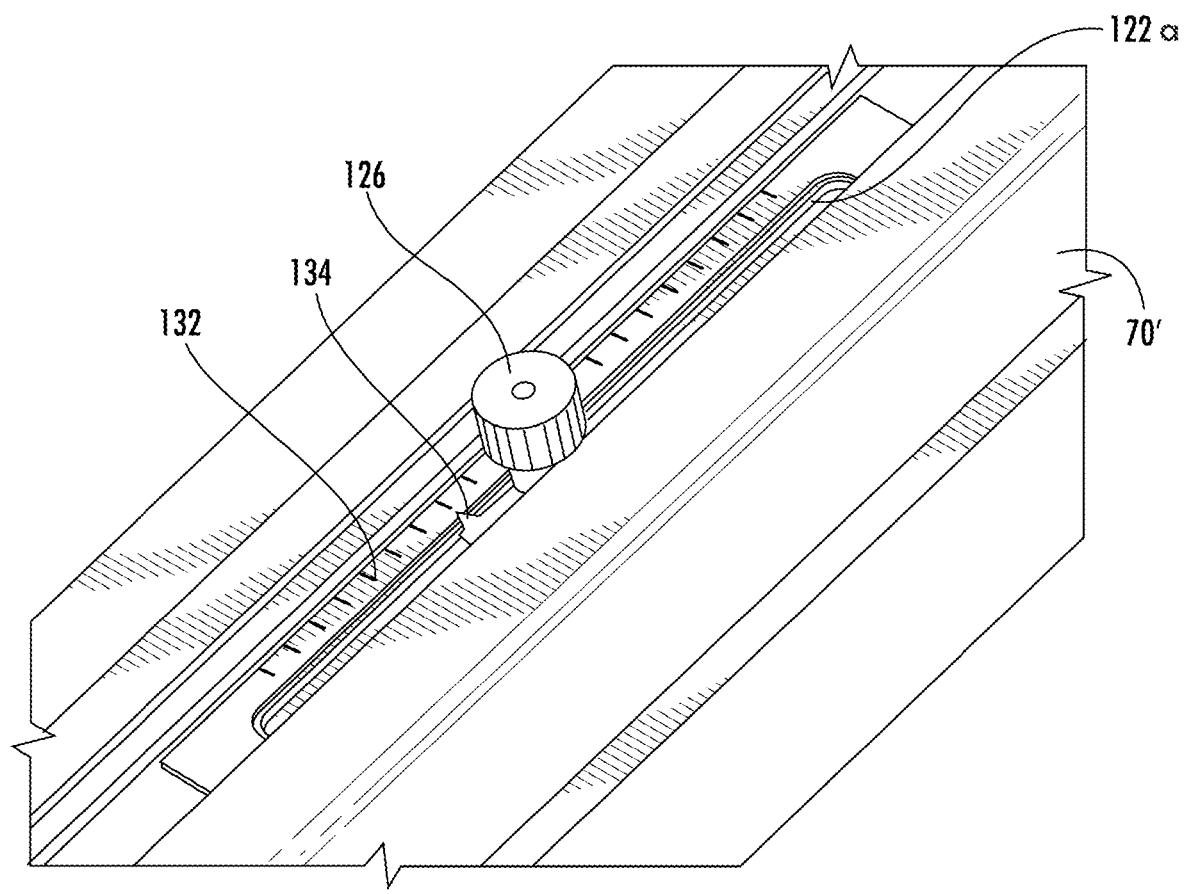
FIG. 17 is an enlarged view of the top of a rip fence incorporating the fine adjustment mechanism components shown in FIG. 16.

A further alternative is shown in FIGS. 16 and 17. In this alternative embodiment, the movable wedge elements 124 are mounted between sliding plates 122a, 122b. The housing 70' is configured to provide opposing tracks to support the two sliding plates 122a, 122b to allow the wedge elements 124 to move along the length of the housing 70' in the same manner as the wedge elements 60 in the embodiment of FIG. 4. The upper sliding plate 122a carries a control assembly 120 which includes a manually engageable control knob 126, similar to the control knob 102 of FIG. 14. The control knob 126 is connected by a shaft 127 to a pinion gear 128. The pinion gear 128 is in meshed engagement with a gear rack 130 that is mounted within the housing 70'. Rotation of the control knob 126 rotates the pinion gear 128 which causes the gear to travel along the gear rack 130. The sliding plates 122a, 122b thus move with the pinion gear, and ultimately the wedge elements 124 move along the length of the housing to engage the wedge elements fixed to the movable side plates, such as plates 52. As shown in FIG. 17, the housing 70' may incorporate a scale 132 and the control knob 126 may include an indicator 134 that moves with the sliding plate 122a as the control knob is rotated. The indicator and scale thus provide a visual indication of the distance that the side plates have traveled relative to the fixed rip fence.

Figure 18:
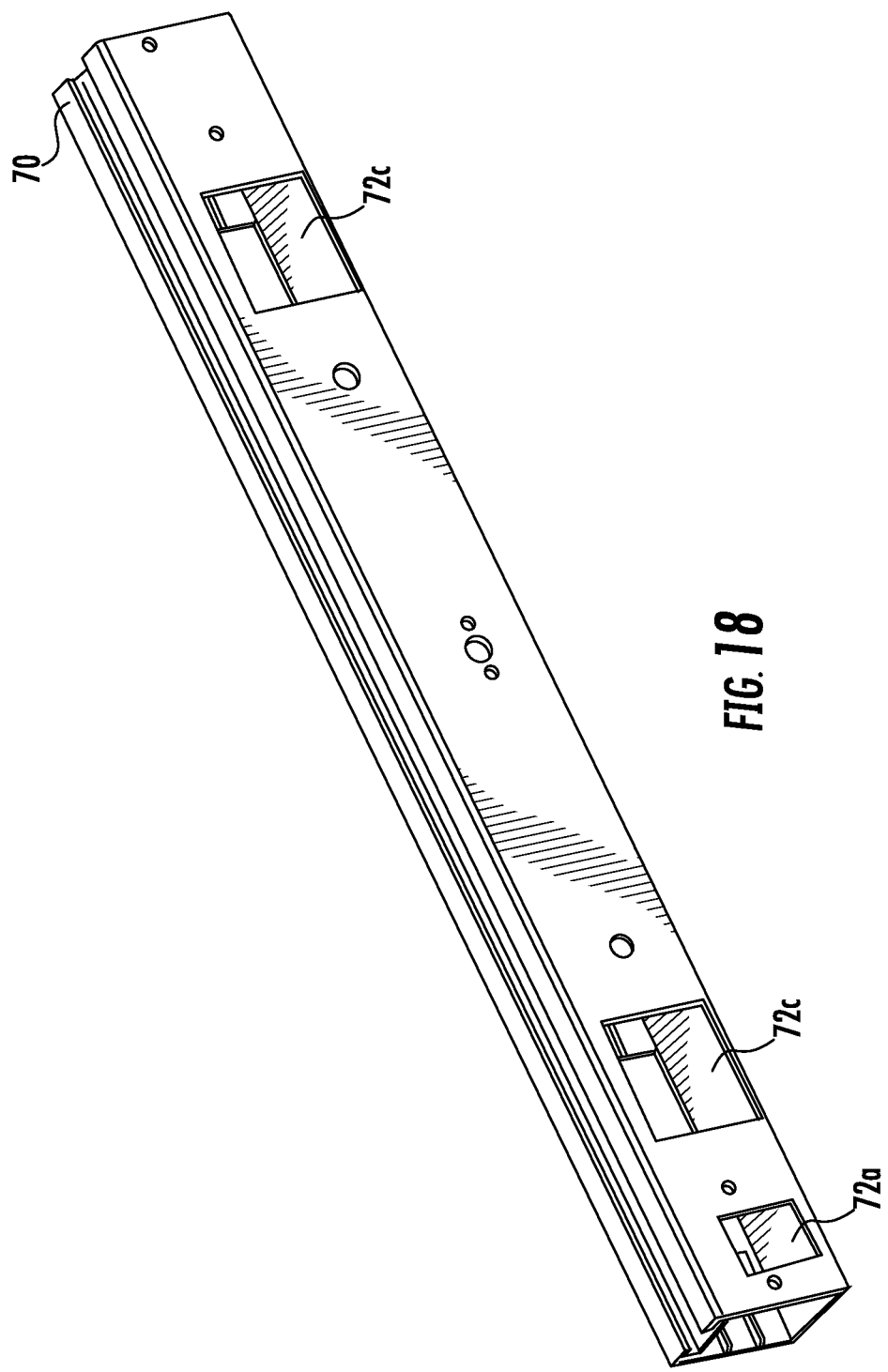
FIG. 18 is perspective view of an extrusion for a housing for the rip fences disclosed herein.
Figure 19:
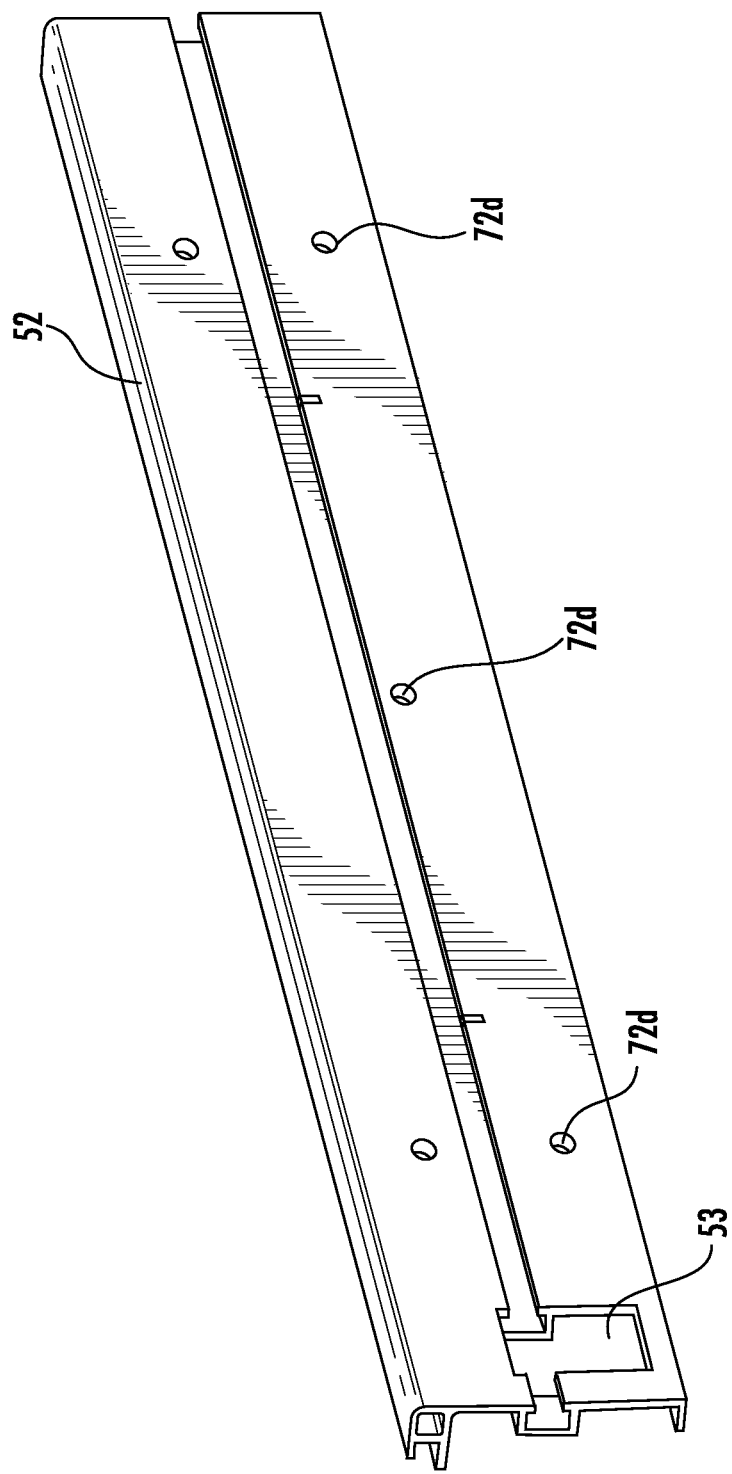
FIG. 19 is perspective view of an extrusion for a movable side plate of the fine adjustment mechanisms disclosed herein.

FIG. 18 shows an extrusion assembly for the rip fence housing 70. The housing includes the openings or apertures 72c to receive the wedge elements 55 mounted to the side plates 52. The opening or aperture 72a may be provided for a side mounted control knob, such as the knob 62 shown in FIG. 3. FIG. 19 shows an extrusion forming a side plate 52. The side plate includes an aperture 53 corresponding to the aperture 72a in the housing 70 for access to the side mounted control knob. The side plate may also include the apertures 72d for receiving the guide 66' shown in FIG. 9.

The present disclosure should be considered as illustrative and not restrictive in character. It is understood that only certain embodiments have been presented and that all changes, modifications and further applications that come within the spirit of the disclosure are desired to be protected.

What is claimed is:

1. A guide assembly for aligning a workpiece on a table of a saw device, the saw device having a saw blade for cutting the workpiece and the table providing a work surface for supporting the workpiece, the work surface having a width dimension parallel to the saw blade, the guide assembly comprising:
   a guide member having a longitudinal axis and a first end and a second end along said longitudinal axis, said guide member having a length along said longitudinal axis between said first end and said second end for spanning said width dimension of said work surface of the table;
   a first locking mechanism located at the first end of the guide member and having a locking position operable to secure the first end to the table;
   a second locking mechanism located at the second end of the guide member and having a locking position operable to secure the second end to the table; and
   an adjustment assembly incorporated into said guide member, said adjustment assembly including:
      a side plate movably mounted to said guide member between said first and second ends, said side plate including an elongated planar surface arranged for being disposed between said guide member and the saw blade when the guide member is secured to the table, said planar surface having a length for spanning the width dimension of the work surface for directly contacting and aligning the workpiece on the table of the saw device as the workpiece is moved on the work surface parallel to the blade; and
      a movement mechanism for moving said side plate relative to said guide member in a direction perpendicular to said longitudinal axis when said first and second locking mechanisms are in the locking positions, wherein said movement mechanism includes:
         at least one wedge element mounted on said side plate, said at least one wedge element including a first sloped surface;
         a movable wedge element associated with a corresponding one of said at least one wedge element, wherein said movable wedge element includes only one of (a) an opposed second sloped surface, complementary with and opposed to said first sloped surface in sliding engagement, and (b) an opposed second sloped surface, complementary with and opposed to said first sloped surface, said opposed second sloped surface including a roller element in engagement with said first sloped surface; and
         a driving member for moving said movable wedge element relative to said corresponding one wedge element so that one of (a) the sliding engagement between said complementary opposed first and second sloped surfaces, and (b) the rolling element moving along said first sloped surface causes the side plate to move in said perpendicular direction.

2. The guide assembly of claim 1, wherein said driving member includes a manually actuatable control knob mounted to the guide member.

3. The guide assembly of claim 1, wherein:
   said driving member includes a threaded rod extending parallel to said longitudinal axis; and said movable wedge element includes internal threads in threaded engagement with said threaded rod, whereby rotation of said threaded rod causes movement of said movable wedge element along said threaded rod.

4. The guide assembly of claim 3, wherein said driving member includes a manually actuatable control knob mounted to the guide member and coupled to said threaded rod to rotate said rod.

5. The guide assembly of claim 4, wherein said control knob is directly mounted to an end of said threaded rod.

6. The guide assembly of claim 4, wherein said control knob is coupled to said threaded rod by a friction interface.

7. The guide assembly of claim 6, wherein said control knob includes a thumb wheel supported on said guide member for access at a side of said guide member.

8. The guide assembly of claim 7, wherein said control knob is supported on said guide member for access at a top of said guide member.

9. The guide assembly of claim 4, wherein said control knob is coupled to said threaded rod by a bevel gear arrangement.

10. The guide assembly of claim 4, wherein:
said threaded rod comprises two threaded rod segments connected at one end by an adjustment nut;
said guide assembly includes two movable wedge elements;
each threaded rod segment includes one of said movable wedge elements movably mounted thereto; and
said side plate includes two of said at least one wedge element mounted thereto in alignment with a respective one of said movable wedge elements on a corresponding one of said threaded rod segments.

11. The guide assembly of claim 1 wherein:
said side plate is a first side plate, and
said adjustment assembly includes a second side plate, said second side plate positioned on a side of said guide member opposite said first side plate; and
said movement mechanism is configured for moving said second side plate in unison with said first side plate.

12. A power saw comprising:
a blade configured for cutting a workpiece;
a table including an elongated opening configured to receive the blade and a work surface for supporting the workpiece to be cut by said blade, said work surface having a width dimension parallel to said blade; and
a guide member having a longitudinal axis and a first end and a second end along said longitudinal axis, said guide member having a length along said longitudinal axis between said first end and said second end that spans said width dimension of said work surface of the table;
a first locking mechanism located at the first end of the guide member and having a locking position operable to secure the first end to the table;

a second locking mechanism located at the second end of the guide member and having a locking position operable to secure the second end to the table; and
an adjustment assembly incorporated into said guide member, said adjustment assembly including:
a side plate movably mounted to said guide member between said first and second ends, said side plate including a planar surface disposed between said guide member and the saw blade, said planar surface having a length spanning the width dimension of the work surface for directly contacting and aligning the workpiece on the table of the saw device as the workpiece is moved on the work surface parallel to said blade; and
a movement mechanism for moving said side plate relative to said guide member in a direction perpendicular to said longitudinal axis toward said blade when said first and second locking mechanisms are in the locking positions and when said guide member is secured to said table at a position offset from said blade in said direction perpendicular to said longitudinal axis, wherein said movement mechanism includes:
at least one wedge element mounted on said side plate;
a movable wedge element associated with a corresponding one of said at least one wedge element, said one wedge element and said movable wedge element defining complementary opposed sloped surfaces in sliding engagement; and
a driving member for moving said movable wedge element relative to said corresponding one wedge element so that the sliding engagement between said complementary opposed surfaces causes the side plate to move in said perpendicular direction.

13. The power saw of claim 12, wherein said driving member includes a manually actuatable control knob mounted to the guide member.

14. The power saw of claim 12, wherein:
said driving member includes a threaded rod extending parallel to said longitudinal axis; and
said movable wedge element includes internal threads in threaded engagement with said threaded rod, whereby rotation of said threaded rod causes movement of said movable wedge element along said threaded rod.

15. The power saw of claim 14, wherein said driving member includes a manually actuatable control knob mounted to the guide member and coupled to said threaded rod to rotate said rod.

16. The power saw of claim 12 wherein:
said side plate is a first side plate, and
said adjustment assembly includes a second side plate, said second side plate positioned on a side of said guide member opposite said first side plate; and
said movement mechanism is configured for moving said second side plate in unison with said first side plate.

* * * * *

UNITED STATES PATENT AND TRADEMARK OFFICE
CERTIFICATE OF CORRECTION

PATENT NO. : 10,576,653 B2
APPLICATION NO. : 15/230058
DATED : March 3, 2020
INVENTOR(S) : Frolov et al.

Page 1 of 1

It is certified that error appears in the above-identified patent and that said Letters Patent is hereby corrected as shown below:

In the Claims

In Claim 10, at Column 9, Line 21, delete the text "claim 4" and insert the text --claim 3-- in its place.

Signed and Sealed this
Seventh Day of July, 2020

Andrei Iancu
*Director of the United States Patent and Trademark Office*